March 8, 1960 A. J. TORRE 2,927,957
COLOR TELEVISION MATRIX AMPLIFIER SYSTEM
Filed April 20, 1954
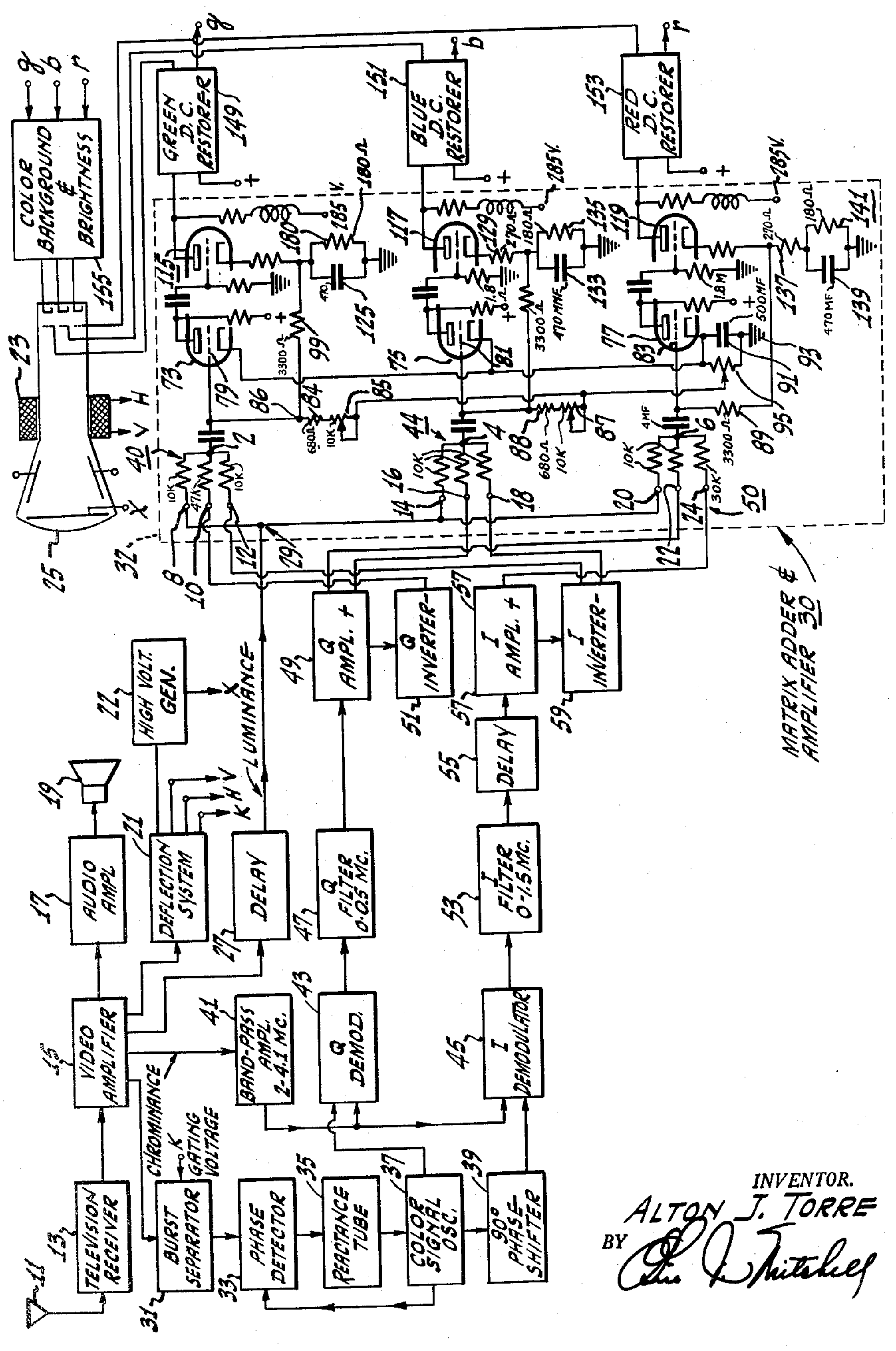
INVENTOR.
ALTON J. TORRE
BY [signature]

United States Patent Office 2,927,957

Patented Mar. 8, 1960

2,927,957

COLOR TELEVISION MATRIX AMPLIFIER SYSTEM

Alton J. Torre, Woodbury, N.J., assignor to Radio Corporation of America, a corporation of Delaware Application April 20, 1954, Serial No. 424,426

8 Claims. (Cl. 178—5.4)

The present invention relates to matrix amplifiers, and more particularly to matrix amplifiers which are used in color television receivers.

The electrical transfer of images in color may be accomplished by additive methods. Additive methods produce natural color images by breaking down the light from an object into a predetermined number of selected primary or component colors. Color images may then be transferred electrically by analyzing the light from an object into not only two image elements, as is accomplished by a normal scanning procedure, but by also analyzing the light from elemental areas of objects of images into selected primary of component colors thereby deriving therefrom a signal representative of each of the selected component colors. A color image may then be reproduced at a remote point by appropriate reconstruction from a component signal train.

In order to utilize the existing radio frequency spectrum more advantageously, there has been approved by the Federal Communicatoins Commission on December 17, 1953, a set of standards known as the NTSC compatible television standards. In the color television signal conforming to these standards, the brightness signal is substantially the same as that conventionally employed for black and white transmission. This signal is called the luminance signal. The color information is contained in a signal called the chrominance signal. The chrominance signal is a color-difference signal information-modulated subcarrier wave separated from the main carrier wave by a frequency substantially equal to that of an odd multiple of one-half the line scanning frequency, namely 3.579 mc. In this chrominance signal the red, green, and blue information is combined to yield what are called I and Q signals which contain the chrominance information. The I and Q signals are used to modulate respectively two subcarriers of the same frequency at the transmitter, with these subcarriers 90° apart in phase. One of the subcarriers is modulated by the I signal and the other is modulated by the Q signal. The modulators employed are of the doubly-balanced type so that the subcarriers are suppressed. This chrominance information combined with the luminance information is then transmitted to the receiver.

In order for demodulation of the chrominance information to be possible in the color television receiver, a synchronous demodulation signal must be produced whose phase is accurately synchronized with a phase of the chrominance signal. The synchronizing information is transmitted in the nature of a burst of approximately 8 cycles in length of the color subcarrier; this burst is located on the back porch of the horizontal synchronizing pulse. The use of such a synchronizing burst was well described in the copending U.S. patent application of Alda V. Bedford, entitled "Synchronizing Apparatus," bearing Serial No. 143,800 and filed February 11, 1950, now Patent No. 2,728,812, issued on December 27, 1955. In order to comply with the NTSC signal specifications, the phase of the burst is 57° ahead of the I component which leads the Q component by 90°.

The luminance, Q and I signal system is a very effective system for transmitting both the luminance and chrominance information. It is to be appreciated, of course, that the function of these signals is to transfer the elemental color information and that since the ultimate objective of the color television receiver is to display a color image on the face of the color display tube, once the I and Q signals have been recovered they must be combined with the luminance signal to eventually yield the red, green, and blue signals which correspond to the elemental areas of the color television picture. It is to be appreciated that the handling of these signal components with regard to addition, combination, and amplification in a suitable matrix amplifier is of great importance if color picture reproduction of good quality is to be achieved.

Consider, therefore, some of the more detailed aspects of the nature of the luminance and the I and Q signals which has direct bearing on the functions and uses of the present invention.

If three primaries are mixed together in right proportions to produce a white matching typical daylight, it has been found experimentally that the green primary located at the center of the visible spectrum accounts for 59% of the brightness sensation, while the red and blue primaries account for only 30% and 11% respectively. It then follows that a suitable luminance signal can be produced combining the signals from the red, green, and blue camera tubes in the proportion:

$$.30R+.59G+.11B \quad (1)$$

If the three camera channels were perfectly linear, then the luminance signal would be identical to that produced by a linear black-and-white camera with optimum spectral response. In actual practice, however, the camera signals are deliberately made nonlinear to compensate for the nonlinearity of kinescopes used in receivers.

I and Q signals may be formed from the red and blue color difference signals, namely $R-Y$ and $B-Y$ signals, by use of the following relationships $$I=.74(R-Y)-.27(B-Y) \quad (2)$$
$$Q=.48(R-Y)+.41(B-Y) \quad (3)$$

where Y denotes the luminance signal. In actual practice the Q signal is a narrow band signal which describes green-purple axis color information in the range from zero to approximately ½ mc., and the I signal describes color information along an orange to cyan axis in the range from approximately zero to 1½ mc. It can be shown that the $R-Y$, $B-Y$ and $G-Y$ color difference signals can be recovered from the I and Q signals by recombining the I and Q signals according to the following relationships $$R-Y=.96I+.62Q \quad (4)$$
$$B-Y=-1.10I+1.70Q \quad (5)$$
$$G-Y=-.28I-.64Q \quad (6)$$

Once these color difference signals which have a bandwidth from 0 to 1½ mc., have been recovered, they may be combined with the luminance or Y signal which has a bandwidth from 0 to 4 mc., using suitable circuitry with the resulting component color information applied to the color kinescope.

It is therefore an object of this invention to provide a channel amplifier of improved gain control characteristics.

It is still another object of this invention to produce a stable three-channel amplifier employing negative feedback.

It is yet another object of this invention to provide a three-channel matrix amplifier for a color television receiver which provides addition in one range of frequencies and amplification in a higher range of frequencies.

It is still another purpose of this invention to provide a three-channel adder circuit for a color television receiver which is stable or relatively free of intercontamination of signals.

It is still another object of this invention to provide a matrix amplifier for a color television receiver which employs negative feedback which provides addition for certain components and amplification for other components, and which provides means for the individual control of each of the channels employed.

According to this invention, a three-channel amplifier is provided, each channel consisting of an adder followed by an amplifier circuit. At the grid circuit of each of the adders are applied the various component signals which are characteristic of the particular channel being considered. Each channel includes a feedback network coupled from the amplifier to the adder of that channel. The feedback network has a frequency response which provides decreased gain at the lower frequencies with the A.-C. feedback voltage included back into the grid circuit of the respective adders to yield both a reduction in input impedance and by suitable use of a potentiometer in each of the grid circuits, a means of adjusting the gain of each amplifier as referred to the gain of a third of one of the channels. In addition, maximum gain is provided at the high frequencies.

Other and incidental objects of the invention will become apparent upon a reading of the following specification and an inspection of the drawing, which is a schematic circuit diagram of a color television receiver including a matrix amplifier embodying the present invention.

An earlier portion of these specifications has discussed the type of signals which are transmitted to a color television receiver and the manner in which the various component signals can be combined to permit a recovery of the original color information.

Consider now the operation of a color television receiver which receives a color television signal modulated carrier. This modulated carrier arrives at the antenna 11 shown in the figure. The signal from the antenna 11 is applied to the color television receiver 13 which performs the well known functions of RF amplification, mixing, IF amplification and detection. These features are described in the paper by Antony Wright entitled "Television Receivers" in the March 1947 issue of the RCA Review. At the output of the television receiver circuit 13 the recovered video and audio information is applied to the proper circuits of the color television receiver in order that the color picture may be properly displayed on the image face of the color kinescope 25.

The recovered video signal is applied to the video amplifier 15 which has five output branches. One is the branch which yields the audio signal which is usually recovered from the combined audio and video signal by the use of well known principles of intercarrier sound. The audio signal is sent to the audio amplifier 17 and then to the loud speaker 19. The deflection information is separated from the video information and is applied to the deflection system which yields appropriate deflection signals to the vertical and horizontal deflection yokes 23. The deflection system also provides the operation of the high voltage generator 22 which yields the high voltages necessary for operation of the color kinescope 25. The luminance information which corresponds to the black-and-white or monochrome information is passed through the delay line 27 to the terminal point 29 from which it will be applied to the matrix amplifier in conjunction with the various chrominance signals in a manner which will be described. The color television receiver must be able to produce a locally generated color subcarrier signal which is accurately phased with respect to the phase of the color subcarrier burst which is included in the video signal. One method of performing this is that shown in block diagram in the figure where it is seen that the video signal issues from the video amplifier and is applied to the burst separator 31. The burst separator utilizes a gating voltage from the deflection system. The separated burst is then impressed on the phase detector 33. The color signal oscillator 37 is a free-running oscillator which is controlled in frequency and phase by the reactance tube 35. By returning a portion of the color signal oscillator output to the phase detector 33 the phase of the burst and the phase of the color signal oscillator are compared with the phase detector 33 delivering an appropriate error or compensating signal to the reactance tube 35 to return the color signal oscillator to proper phase should it drift or change from this phase. The output of the color signal oscillator 37 is then applied directly to the Q demodulator 43 and through the 90° phase shifter 39 to the I demodulator 45.

The color television signal which issues from the video amplifier 15, is sent through the band pass amplifier 41 which eliminates those components not lying in the band from 2 to 4.1 mc. The filtered chrominance signal is then applied to the Q demodulator 43 and the I demodulator 45 where by use of the processes of synchronous detection the I and Q signals are recovered from their respective demodulators. The Q signal which is a narrow band signal is passed through a filter having a pass band from 0 to ½ mc. The I signal which is a wide band signal is passed through an I filter which has suitable transmission characteristics in the range from 0 to 1½ mc. The I signal is also passed through a delay line 55 to compensate for the difference in the time delay of the various filters used. The Q signal is passed through the Q amplifier 49 and into the Q inverter 51. The I signal is passed through the I amplifier 57 and into the I inverter 59.

Issuing forth from the Q amplifier 49, Q inverter 51, I amplifier 57 and I inverter 59, are filtered +I, −I, +Q, and −Q signals respectively, which can be combined in the proportions shown in Equations 4, 5, and 6 to produce the $R-Y$, $B-Y$, and $G-Y$ color difference signals at the terminal 2 of the green adder 73, the terminal 4 of the blue adder 75, and the terminal 6 of the red adder 77 in the matrix adder and amplifier 30. The luminance signal Y is applied simultaneously to the terminals 2, 4, and 6 to cause the formation of green, blue and red signals respectively, at these terminals.

The red, green, and blue signals are then appropriately amplified in the matrix adder and amplifier 30, with the green signal applied to the green D.-C. restorer 149, the blue signal applied to the blue D.-C. restorer 151, and the red signal applied to the red D.-C. restorer 153. From these respective D.-C. restorers the red, green, and blue signals are impressed on proper grids of the tri-color kinescope 25 in addition to proper color and background and brightness signals which are applied to the color background and brightness circuits 155.

In the matrix adder and amplifier circuit 30 a number of performance features are required in order for the proper signals to be impressed on the tri-color kinescope 25. One involves the stability of these circuits. Stability in the present invention is to a large extent accomplished by the fact that all three cathodes of the green adder 73, the blue adder 75 and the red adder 77 are tied together and incorporated with a single resistance-condenser network for furnishing a bias voltage. The resistance-condenser network is the network made up of the condenser 91, which is shunted by a potentiometer 95. Note in the figure that the grid bias voltage obtained from the potentiometer 95 provides one of the bias potentials of the green adder 73 and the blue adder 75.

Another important performance feature is one of being able to vary the gain of the respective channels of the matrix adder and amplifier circuit 30 without the variation of gain in one channel unduly affecting the variation of gain in another. This can be accomplished in the matrix adder and amplifier circuit 30 by utilizing feedback voltages which can be instituted into the three channels in such a way that interchannel color contamination and interference would be negligible.

These features are incorporated in the design shown in the matrix adder and amplifier circuit 30 which forms one embodiment of the present invention. Note that each of the three channels, namely the green, the blue, and the red channels, provides negative feedback from the corresponding amplifier to the corresponding adder by use of shunt resistance-condenser networks which have been incorporated in the cathode circuit in the green amplifier 115, in the blue amplifier 117, and the red amplifier 119. The resistance-condenser network which in combination with the red amplifier 119 consists of the resistance 141 in shunt with the condenser 139 is so designed that it provides a degeneration voltage to the grid of the red amplifier 119, which is frequency dependent to an extent dependent upon the magnitude of condenser 139 and the resistor 141; this resistor-condenser network is also utilized as the source of the feedback voltage which is returned to the grid 83 of the red adder tube 77.

In the red channel which includes the red adder 77 and the red amplifier 119, the feedback level from the red amplifier 119 circuit is fixed by having constant parameters in the circuit. Therefore, the red channel will be a circuit which will be maintained constant with the provisions for variation in gain being incorporated in the green channel and the blue channel. Since more signal voltage is necessary to drive the red phosphors of the kinescope 25, this gives maximum gain for the red channel while providing lesser and controllable gain for the green and blue channels.

Consider now the feedback circuit of the green channel. The feedback voltage is produced across the resistance 180 which is in shunt with the condenser 125. This feedback voltage is passed through resistor 99 to the terminal point 86 which is connected directly to the grid 79 of the green adder 73. To the terminal point 86 is also connected one end of the series circuit made up of the resistor 84 and the adjustable resistance 85 whose other end is connected to the potentiometer 95 in the cathode circuit of the red adder 77, this cathode circuit producing the D.-C. bias of not only the red adder 77, but as has been mentioned, also of the blue adder 75 and the green adder 73. By varying the variable contact on the variable resistor 85 it is possible to vary the signal feed back voltage as developed across the resistors 84 and 85 which is impressed on the control grid 79 of the green adder 73. This provides an effective way of varying the gain of the green adder 73. Because of the well known impedance properties of the shunt RC network consisting of the condenser 125 shunting the resistor 180, the feedback voltage delivered to the grid 79 will be greatest at the low frequencies and will decrease as the frequency is increased; the feedback voltage delivered to the grid 79 will also decrease the input impedance seen at the terminal 2 by the resistance cluster with this input impedance increasing with increasing frequency. In each of the red, blue and green channels whose input terminals are given respectively the numerals, 6, 4, and 2, suitable adder performance for the lower frequency color signals and amplifier operation for the higher frequency mixed highs is provided, and with the input impedance of each first stage reduced in the lower frequency range, less inter-contamination is produced in the three-resistance networks 40, 44 and 50.

In a manner identical to that which has been described with respect to the green channel, the gain can also be varied in the blue channel by control of the variable resistance 87.

In an operating circuit functioning according to the present invention the gain characteristics of the matrix adder and amplifier circuit 30 have been found to be relatively independent of the relative values of resistance of each of the resistors in the three-resistance clusters 40, 44 and 50. By using, for example, the 47,000 ohm resistor which delivers an inverted Q voltage to the terminal 2 in conjunction with resistors each having a resistance of 10,000 ohms from the luminance terminal 12 and the I inverter 59, an error of only 2% occurs in the matrix over the entire gain range.

Having described the invention, what is claimed is:

1. In a three-channel amplifier, each of said channels consisting of a cascaded pair of amplifiers having an input terminal and an output terminal, a gain control system comprising in combination, means for generating a bias voltage in the first stage amplifier of said pair of amplifiers of one of said channels, means for applying said generated bias voltage to the first stage amplifier of each of the other of said channels, and means for applying an adjustable amount of feedback voltage to the first stage amplifier of said pair of amplifiers from the second stage amplifier of said pair of amplifiers in each of said channels to provide gain control of each of said channels.

2. A three-channel amplifier as set forth in claim 1 wherein means are provided for utilizing the feedback voltage in one of said channels as a reference voltage, and wherein the feedback voltage in the other two of said three channels is adjusted with respect to said reference voltage.

3. In a three-channel signalling system, each of said channels consisting of a cascaded pair of amplifiers, a gain control system comprising in combination, means for generating a bias voltage in the first amplifier stage of said pair of amplifiers of one of said channels, means for utilizing a prescribed portion of said generated bias voltage in the first stage amplifier of each of the other of said channels, means for generating a feedback voltage in the second stage of said cascaded pair of amplifiers of said three-channel signalling system, means for applying said feedback voltage to the corresponding first stage amplifier of each of said channels of said three-channel signalling system, means for causing said feedback voltage to have frequency characteristics which provide for maximum feedback at the lower frequencies and a frequency response roll off at a prescribed higher range of frequencies, and means for adjusting the level of feedback voltages in each of said channels to control the gain of each of said channels.

4. In a color television system, said color television system adapted to receive a composite television signal including at least a luminance and two chrominance signals, respectively, for forming a color television picture, a gain control system for a matrix amplifier adapted to combine the color difference signals in proper proportions to produce red, blue, and green signals, comprising in combination, a red channel amplifier having a red channel input terminal and a red channel output terminal and including a series of cascaded red signal amplifiers, means for impressing said color difference signals at said red channel input terminal in proper proportions to produce a red signal, means for developing a direct-current bias voltage in the first amplifier of said cascaded red signal amplifiers, means for applying said bias voltage to said first amplifier, means for developing a red signal negative feedback voltage in a later stage of said series of cascaded red signal amplifiers, means for applying said red negative signal feedback voltage to said first red signal amplifier to provide gain control of said red amplifier channel; a blue channel amplifier having a blue channel input terminal and a blue channel output terminal and including a series of cascaded blue signal amplifiers, means for impressing said color difference signals at said blue channel input terminal in proper proportions to produce a blue signal, means for applying a prescribed portion of said direct-current bias voltage developed in said red signal channel to the first amplifier of said series of cascaded blue signal amplifiers, means for developing a blue signal negative feedback voltage in a later stage of said series of cascaded blue signal amplifiers, means for applying said blue signal negative feedback voltage to said first blue signal amplifier to provide gain control of said blue amplifier channel; a green channel amplifier having a green channel input termnial and a green channel output terminal and including a series of cascaded green signal amplifiers, means for impressing said color difference signals at said green channel input terminal in proper proportions to produce a green signal, means for utilizing a prescribed portion of said grid bias voltage developed in said red signal channel to provide bias for the first amplifier of said series of cascaded green signal amplifiers, means for developing a green signal feedback voltage in a later stage of said series of cascaded green signal amplifiers, and means for introducing said green signal feedback voltage in an adjustable amount in the first green signal amplifier to perform the function of inverse feedback and to yield gain control of said green amplifier channel.

5. In a color television receiver system adapted to receive a composite color television signal including at least a luminance and two chrominance signals corresponding to Y, I and Q signals, respectively, for forming a color television picture, said luminance signal containing mixed highs information, a combined adder and amplifier matrix system adapted to combine the Y, I and Q signals in proper proportions in one band of frequencies to produce red, green, and blue signals and to amplify the mixed highs signals in a prescribed higher band of frequencies so that these mixed highs signals can be added to the respective relatively low frequency red, green, and blue signals, said combined adder and amplifier matrix system comprising in combination, a red amplifier channel having a red signal input terminal and a red signal output terminal and including a series of cascaded red signal amplifiers, means for impressing said Y, I and Q signals at said red input terminal in proper proportions to produce a red signal in addition to a mixed highs signal, circuit means for developing a red signal feedback voltage in a succeeding stage of said series of cascaded red signal amplifiers, said circuit means having a frequency response to provide an A.-C. feedback voltage of prescribed lower level amplitude characteristics for said one band of frequencies and a feedback voltage having an even lower level of amplitude for said one band of frequencies, means for applying said feedback voltage to said first red signal amplifier to provide adder operation thereof for the lower frequency red signal range and amplifier operation for the higher frequency mixed highs range; a blue amplifier channel having a blue signal input terminal and a blue signal output terminal and including a series of cascaded blue signal amplifiers, means for impressing said Y, I and Q signals at said blue input terminal in proper proportions to produce a blue signal in addition to a prescribed mixed highs signal, circuit means for developing a blue signal feedback voltage in a succeeding stage of said series of cascaded blue signal amplifiers, said last mentioned circuit means having a frequency response to provide an A.-C. feedback voltage of prescribed lower-level amplitude characteristics for said one band of frequencies and a feedback voltage having an even lower amplitude level for said higher band of frequencies, means for applying said feedback voltage to said first blue signal amplifier to provide adder operation thereof for the lower frequency blue signal range and amplifier operation for the higher frequency mixed highs range, a green amplifier channel having a green input terminal and a green output terminal and including a series of cascaded green signal amplifiers, means for impressing said Y, I and Q signals at said green input terminal in proper proportions to produce a green signal in addition to a mixed highs signal, circuit means for developing a green signal feedback voltage in a succeeding stage of said series of cascaded green signal amplifiers, said last-mentioned circuit means having a frequency response to provide an A.-C. feedback voltage of lower level amplitude characteristics for said one band of frequencies and a feedback voltage having principally an even lower level amplitude level for said higher band of frequencies, and means for applying said feedback voltage to said first green signal amplifier to provide adder operation thereof for the lower frequency green signal range and amplifier operation for the higher frequency mixed highs range.

6. The invention as set forth in claim 5 wherein a D.-C. bias voltage is developed in the first red signal amplifier and predetermined amounts thereof are applied to the first signal amplifiers of the blue signal channel and the green signal channel respectively, and wherein each of said color amplifier channels includes potentiometer means for adjusting the level of said feedback voltages.

7. In a three-channel signalling system, each of said channels consisting of a cascaded pair of amplifiers to which are coupled a plurality of intelligence signals having at least a first bandwidth in common, a gain control system comprising in combination, means for generating a bias voltage in the first stage amplifier of said pair of amplifiers of one of said channels, means for applying a prescribed portion of said generated bias voltage to the first stage amplifier of each of the other of said channels, means for generating a feedback voltage of maximum amplitude for a frequency range in said first bandwidth in the second stage amplifier of said cascaded pair of amplifiers of said three-channel signalling system, and means for applying said feedback voltages developed in each of said channels to the respective first stage amplifier for causing each channel of said three channel amplifier to optimally function as an adder of said plurality of intelligence signals over said first bandwidth.

8. In a three-channel signalling system, each of said channels consisting of a cascaded pair of amplifiers, each having input terminals, a gain control system comprising in combination, means for generating a bias voltage in the first stage amplifier of one of said channels, means for applying a prescribed portion of said bias voltage to the first stage amplifier of each of the other of said channels, each of said channels including a cathode degeneration circuit, connected with the second stage amplifier of each of said channels, each of said cathode degeneration circuits having a prescribed impedance versus frequency characteristic to develop a larger voltage in a prescribed lower frequency range than in a higher frequency range, means for applying the developed voltage to the corresponding first stage amplifier of each of said channels to provide a relatively low impedance across said input terminals at a lower frequency range and a higher impedance over a higher frequency range.

References Cited in the file of this patent

UNITED STATES PATENTS

| | | |
|---|---|---|
| 2,401,779 | Swartzel | June 11, 1946 |
| 2,566,333 | Huntoon | Sept. 4, 1951 |
| 2,716,151 | Smith | Aug. 23, 1955 |

OTHER REFERENCES

Introduction to Color Television, Admiral Corporation, February 1954. (Copy in Division 16.)

RCA Color Television Receiver Model CT 100, published March 31, 1954.